United States Patent [19]

Huxley

[11] Patent Number: 4,648,464

[45] Date of Patent: Mar. 10, 1987

[54] CULTIVATING TOOL

[75] Inventor: Edward J. Huxley, Spennymoor, England

[73] Assignee: Black & Decker Inc., Newark, Del.

[21] Appl. No.: 752,505

[22] Filed: Jul. 3, 1985

[30] Foreign Application Priority Data

Jul. 5, 1984 [GB] United Kingdom ............. 8417124

[51] Int. Cl.$^4$ ............. A01D 34/10; A01B 79/00; A01B 1/10

[52] U.S. Cl. ............. 172/36; 30/228; 56/16.7; 172/41

[58] Field of Search ............. 172/41, 48, 13, 125, 172/14–17, 36; 30/220, 296 R, 296 A, 228, 247, 248, DIG. 5; 56/16.7, 17.6, 240, 241, 293

[56] References Cited

U.S. PATENT DOCUMENTS

| 178,500 | 6/1876 | Wuterich | 30/247 |
|---|---|---|---|
| 1,489,658 | 4/1924 | Campbell | 30/216 |
| 2,736,961 | 3/1955 | Howell | 30/213 |
| 3,126,968 | 3/1964 | Booth | 172/16 |
| 3,623,223 | 11/1969 | Edgell et al. | 30/220 |
| 3,710,870 | 1/1973 | Pfeiffer | 172/41 X |
| 3,805,385 | 4/1974 | Ritums et al. | 30/220 |
| 3,958,331 | 5/1976 | Klebe, Jr. | 172/41 X |
| 3,973,378 | 8/1976 | Bartasevich et al. | 56/17.6 X |
| 4,018,037 | 4/1977 | Weber | 56/16.7 |
| 4,075,760 | 2/1978 | Germain | 30/220 |
| 4,122,601 | 10/1978 | Katsuya | 30/296 A |
| 4,293,041 | 10/1981 | Holmstadt et al. | 172/39 |
| 4,351,396 | 9/1982 | Moulton | 172/41 X |
| 4,364,435 | 12/1982 | Tuggle et al. | 172/41 X |
| 4,452,316 | 6/1984 | Edwards | 172/41 |
| 4,501,332 | 2/1985 | Straayer | 172/41 |
| 4,541,492 | 9/1985 | Motruk | 172/41 |

FOREIGN PATENT DOCUMENTS

| 1462968 | 1/1977 | United Kingdom | 172/36 |
|---|---|---|---|
| 2161354 | 1/1986 | United Kingdom | 172/36 |

Primary Examiner—Richard J. Johnson
Assistant Examiner—Terrence L. B. Brown
Attorney, Agent, or Firm—Edward D. Murphy; Harold Weinstein; Edward D. C. Bartlett

[57] ABSTRACT

A cultivating tool comprises a housing, an electric motor mounted within the housing, a pair of soil working members which project from the housing, an elongate shaft connected at one end to the housing, and a handle at the other end of the shaft. The soil working members are of generally lamellar construction and arranged to be reciprocated relative to one another transverse to the direction from which they project from the housing and in adjacent parallel planes. The tool handle incorporates a switch with a lock off mechanism. In normal use of the tool the soil working members penetrate into soil to be cultivated and disturb the soil.

13 Claims, 8 Drawing Figures

CULTIVATING TOOL

FIELD OF THE INVENTION

The invention relates to a cultivating tool, a method of cultivating soil and a handle for a tool. More particularly the cultivating tool and method of cultivating are provided primarily for surface cultivation of soil. The tool handle of the invention is primarily intended for use as part of the cultivating tool of the invention but may also be used on other tools.

BACKGROUND OF THE INVENTION

Surface cultivation of soil has in the past proved a time consuming and arduous task for a gardener, particularly where because of trees, paving stones or other obstructions it is awkward to operate upon the soil to be cultivated. The tools available for such surface cultivation have also been very limited. A tool known as a "Dutch hoe" has been used. This tool can be dragged across the surface of soil to be cultivated and disturbs the surface enabling weeds to be removed. Operation of such a tool is very arduous. Large powered cultivators which are able to cultivate soil to a reasonable depth are also available but these tools are expensive and large so that they cannot be used in awkward places.

It has been proposed to provide a relatively small power operated cultivating tool which may be used for surface cultivation of soil, but as yet no satisfactory tool has been provided.

SUMMARY OF THE INVENTION

It is an object of the present invention to provide a cultivating tool which can be used for surface cultivation of soil not only between rows of plants or in flower beds but also in more awkward places such as adjacent trees, fences or paving stones.

According to the invention there is provided a cultivating tool comprising a housing, an electric motor mounted within the housing, a pair of soil working memberw which project from the housing, the members being of generally lamellar construction and arranged to be reciprocated relative to one another transverse to the direction in which they project from the housing and in adjacent parallel planes, an elongate shaft connected at one end to the housing and extending from the housing in a direction away from the projecting blades, and a handle at the other end of the shaft.

With this cultivating tool surface cultivation of soil is greatly facilitated. The transverse relative reciprocation of the soil working members in adjacent parallel planes makes penetration of the soil working members into the soil much easier; indeed in an embodiment of the invention to be described later the soil working members will penetrate normal soil merely under the force of the weight of the tool so that no external pressure is required by an operator.

Preferably the electric motor is arranged to reciprocate both soil working members in opposite directions. This arrangement again assists penetration of the soil working members into the soil and also balances the tool.

A respective eccentrically mounted cam member may engage each soil working member to reciprocate the members. The cam members are mounted eccentrically on opposite sides of the axis about which they are rotated.

The relative reciprocation of the soil working members is preferably relative pivotal movement. The soil working members can readily be mounted in the tool housing for pivotal movement and such pivotal movement reduces the possibility of an obstruction becoming wedged between the soil working members during their pivotal movement.

The soil working member may be mounted to pivot about a point located to one side of a longitudinal centre line of the member, alternatively it may be mounted to pivot about a point on the longitudinal centre line.

Each soil working member may be generally fork-shaped at its outer end. The fork-shaped end of each soil working member preferably defines at least one gap between adjacent portions of the end, the width of the gap increasing towards the extremity of the member. The fork-shaped ends again facilitate penetration of the soil working members into the soil and the increasing width of the gap(s) in each member reduces the possibility of an obstruction becoming wedged between the soil working members.

During a full cycle of reciprocation of the soil working members the relative movement of one soil working member relative to the other may be approximately the width of said at least one gap. When the soil working members are in their central position the gaps in the members are preferably aligned.

The soil working members are preferably arranged such that when they are reciprocated relative to one another they provide a shearing action for cutting vegetation and the like. This shearing action is useful in assisting the members to pass through the roots of weeds or other vegetation that may be in the soil and also enables the tool to be used to cut grass, weeds or the like above the soil. The lateral faces of each soil working member that are involved in the shearing action are preferably relatively thick so that they are not easily damaged.

The tool housing may have an exterior base surface for supporting the tool on the ground, the base surface being inclined at an acute angle to the planes of the soil working members. With such an arrangement, when the base surface is rested on the ground the soil working members are inclined downwardly towards the soil at an angle close to that at which they are intended to work.

The shaft of the tool may be inclined at an angle of about 45° to the planes of the soil working members. While the tool is normally used with the soil working members almost horizontal it may sometimes be advantageous to use the tool with the working members approximately vertical. In such a case the orientation of the tool is changed by 90° but the shaft of the tool is again inclined at an angle of about 45°. Preferably the handle is arranged for the tool to be held in either of these two orientations.

The handle may include switch means for controlling operation of the motor.

The handle may have a tubular portion, which is transverse to the elongate shaft, for gripping by an operator.

The longitudinal axis of the tubular portion and the longitudinal axis of the shaft may generally lie in a common plane.

BRIEF DESCRIPTION OF THE DRAWINGS

By way of example, a cultivating tool embodying the invention will now be described with reference to the accompanying drawings, of which.

DETAILED DESCRIPTION OF THE PREFERRED EMBODIMENTS

Figure 1:
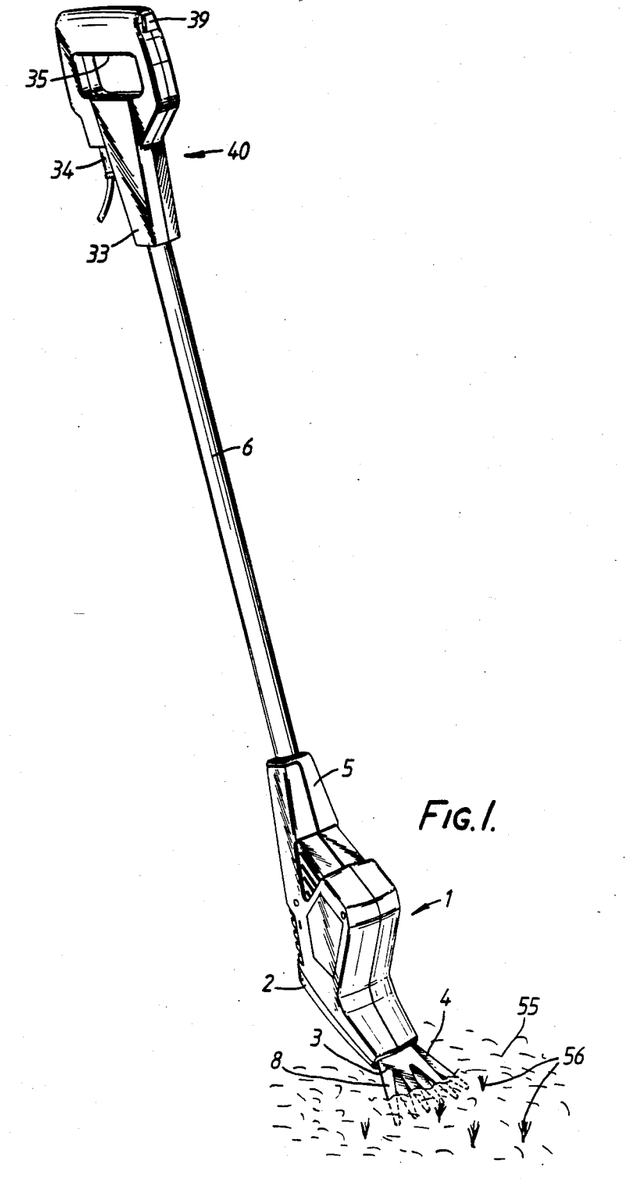
FIG. 1 is a perspective view of the tool in operation.
Figure 2:
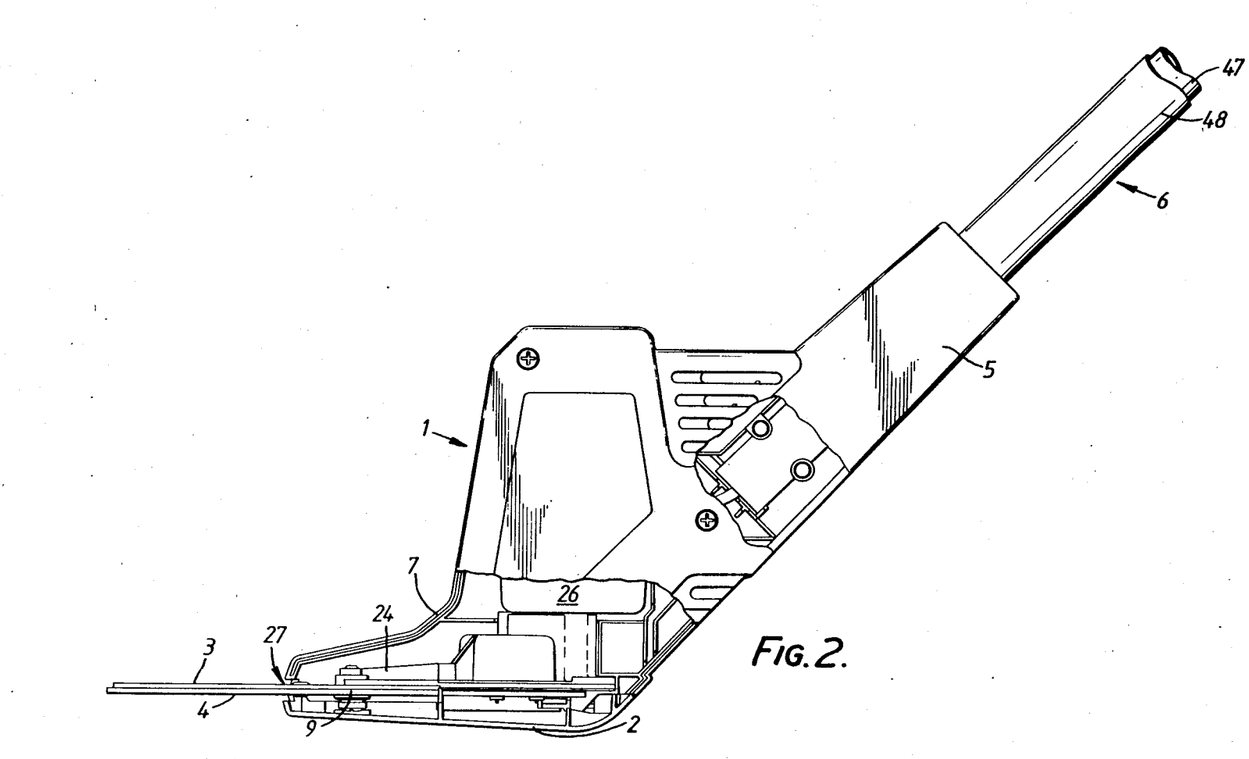
FIG. 2 is a side view, partially cut away, of the tool head.

Referring first to FIGS. 1 and 2, the tool shown has an angled head 1 with a sole plate 2 extending substantially horizontally. The head accommodates two cultivating blades 3, 4 projecting from the end of the head at an acute angle to the sole plate, as shown in FIG. 2. The upper portion 5 of the head extends upwardly at an angle of approximately 45° to the sole plate 2 and receives one end of a shaft in the form of a tubular stem 6 at the other end of which is located the handle 40 of the tool. The length of the stem 6 is such that, when the tool is held by the handle by an operator standing up, the tool blades 3, 4 can be used to carry out surface cultivation of the soil.

The blades 3, 4 are driven by a motor 26 mounted in the head 2 within a casing 7 which is of clam shell construction and extends upwardly from the head perpendicular to the sole plate 2. The end portions of the blades 3, 4 are generally fork-shaped, each having three diverging prongs 8. The blades are located one on top of the other and pivotally mounted within the housing formed by the casing 7 and sole plate 2 as described below for movement about an axis perpendicular to the plane of the blades 2: the position of the axis is indicated at 9 in FIG. 2.

Figure 5:
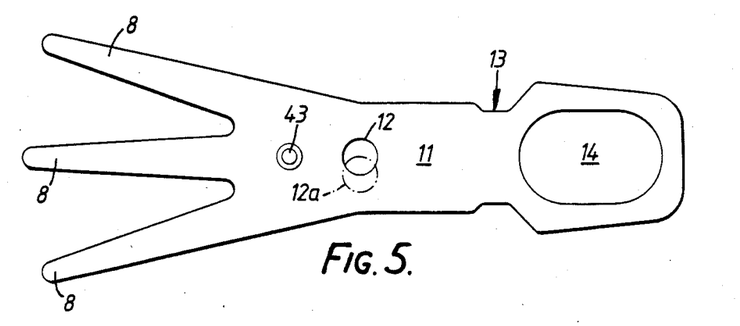
FIG. 5 is a plan view of one of the blades of the tool.

The whole of a cultivating blade, removed from the tool, is shown in FIG. 5. The prongs 8 extend from a main body 11 of the blade in which, proceeding towards the other end of the blade, are formed a dome 43, an aperture 12, then a portion 13 of reduced width and finally, at the other end of the blade, an elongated aperture 14.

The aperture 12 which, as shown in FIG. 5, is located on the longitudinal centre line of the blade, is used for the pivotal mounting of the blade within the tool head 1. Each blade has the same shape but one is turned over before being placed on top of the other with the aperture 12 in alignment.

Figure 3:
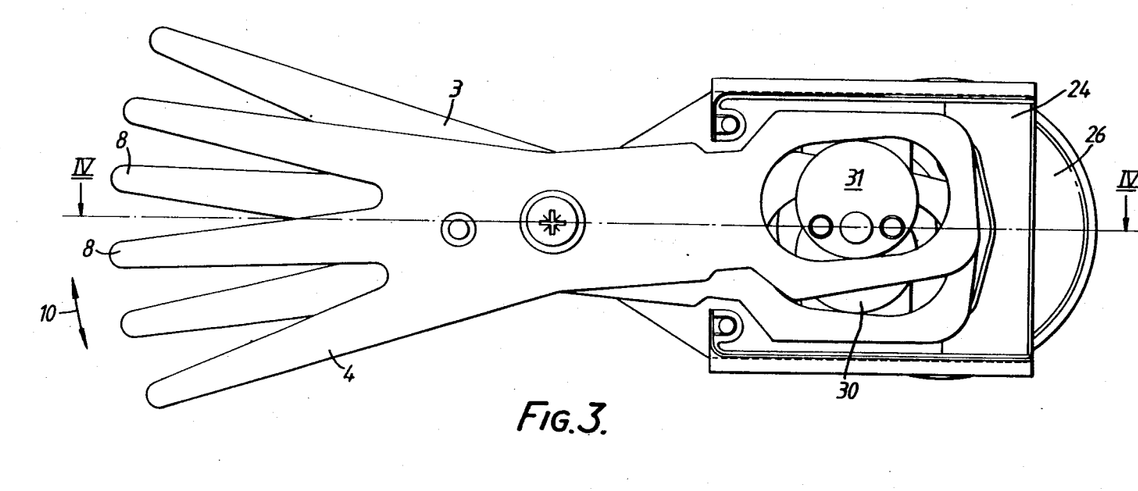
FIG. 3 is an underneath plan view of the motor gearbox and blade assembly of the tool.
Figure 4:
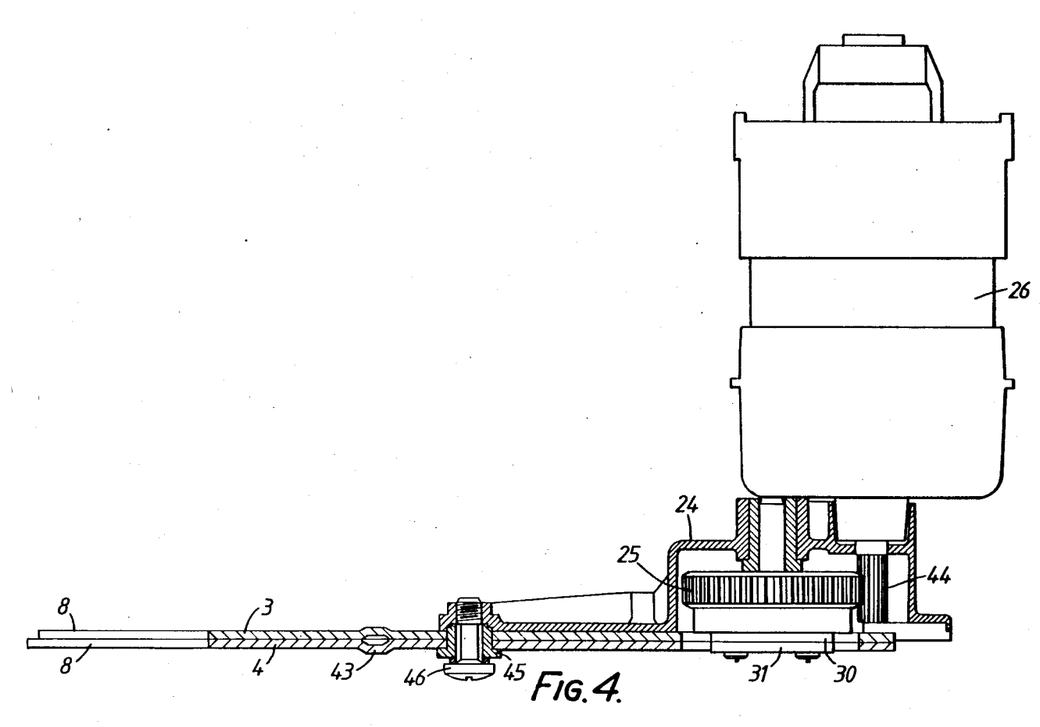
FIG. 4 is a sectional side view along the lines IV—IV in FIG. 3.

Referring now also to FIGS. 3 and 4, the motor 26 is attached to a gear housing 24 and has a drive shaft 44 which meshes with a gear 25 rotatably mounted in the housing 24. Fixed to the gear 25 are two cams 30, 31 which are mounted on opposite sides of the axis of rotation of the gear 25. Each cam 30, 31 is circular and is located within the elongated aperture 14 of its respective blade. The blades 3, 4 are pivotally mounted on the gear housing 24 being pivotable about a bushing 45 passing through the aperture 12 in the blades and secured to the gear housing by a screw 46. As a result, when the motor 26 is operated, the cams 30, 31 will cause the blades 3, 4 to reciprocate in antiphase relationship to one another about the bushing 45 (see FIG. 4) as indicated by the arrow 10 in FIG. 3.

The sole plate 2 is secured by screws (not shown) to the casing 7 and the blades 3, 4 are sandwiched between projecting portions of the sole plate 2 and the gear housing 24. The forked end portions of the blades 3, 4 project from the casing 7 through a slit 27 in the front end of the casing.

The narrowed portion 13 of the blades ensure adequate clearance between the blades and adjacent parts of the tool head during reciprocal movement. In a central position the blades 3, 4 are aligned with one another while at either end of their reciprocating stroke (one end being shown in FIG. 3) the relative movement of the prongs 8 of the two blades is about half the separation of adjacent prongs of the same blade.

The tubular stem 6 of the tool is received in an aperture at the upper end of the tool head casing 7 and secured in any suitable manner. The other end of the stem 6 is similarly received and secured in an aperture in a downward-extending portion 33 of the tool handle 40 which is of clam shell construction. The stem 6 comprises, in the example illustrated, a metal tube 47 with a plastics insulating sleeve 48. The tool handle resembles that of a garden spade, being generally rectangular with a central aperture, but mounted at right angles to the conventional direction. The power supply cord enters the tool through an aperture in the lower part of the handle, fitted with a cord protector 34 and the supply of power to the motor is controlled by a switch housed within the handle 40 and operated by an actuating member in the form of a switch bar or bar 35 on an upper tubular portion (i.e. the grip) of the handle. The longitudinal axis of the tubular portion of the handle 40 lies in the same plane as the longitudinal axis of the stem 6.

Figure 6:
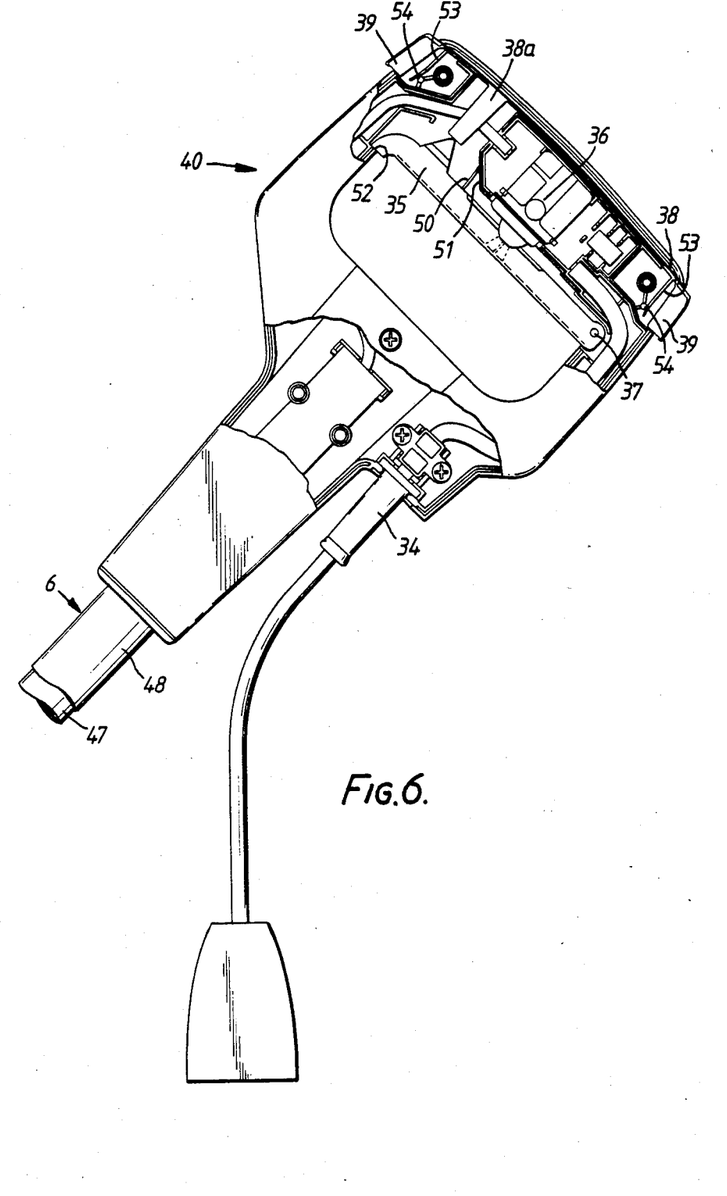
FIG. 6 is a side view, partially cut away, of the tool handle.

FIG. 6 shows further details of the handle and indicates the location of a switch 36 within the handle and a pivotal mounting 37 of the bar 35 such that, by squeezing the handle grip, the bar 35 can be moved further into the tubular portion of the handle to operate the switch and actuate the motor 26. The bar 35 is resiliently biased downwardly away from the tubular portion of the handle by an integral leaf spring 50 which extends perpendicular to the bar 35 and engages an inclined surface 51 within the handle. Outward movement of the bar 35 is limited by engagement of the free end of the bar with a shoulder 52 formed on the handle. When the pressure on the handle grip is released, the switch bar 35 moves back to its original position and the switch 36 operates to disconnect the motor. The handle also incorporates an interlock arrangement to prevent accidental operation of the tool. More particularly, the handle houses a resiliently-biased lock off member 38 which extends across the top of the handle and has a downwardly extending portion 38a which in the neutral position of the member co-operates with the switch bar 35 to prevent operation of the bar. The lock off member 38 is provided with a pair of integral leaf springs 53 which engages bosses 54 inside the handle and bias the member 38 into its central, neutral position. Operating buttons 39 are provided at each end of the member 38 and project at each end of the tubular portion of the handle so that the member 38 can be displaced from its central position by an operator pressing inwardly on whichever button is more convenient. When the bar 35 is released, the member 38 returns, under the action of the resilient bias, to its original position.

Normal operation of the tool is illustrated in FIG. 1. An operator wishing to cultivate soil 55 containing weeds 56 grips the tubular portion of the handle 40 with one hand and may grip the stem 6 with the other hand. With the tips of the blades 3, 4 resting on the top of the soil the operator shifts one of the operating buttons 39 with the thumb of the hand gripping the handle and squeezes the handle thereby moving the switch bar 35 into the handle and operating the switch 36. The motor 26 then reciprocates the blades 3, 4 and as a result of the force exerted by the tool's own weight, the blades 3, 4 penetrate into the soil and thoroughly disturb it. Weeds 56 in the vicinity of the blades will be freed from the soil as a result of the disturbances caused by the blades. Any small roots in the path of the blades 3, 4 will be cut by the blades. The operator can manoeuvre the tool with the blades remaining in the soil or can lift the tool away from the soil and set it down in another location to be weeded or otherwise cultivated.

If the operator wishes to cut the tops off weeds, or the like above ground level the tool can be operated resting on its sole plate 2 with the blades 3, 4 just clear of the ground. In this case the blades will cut off the vegetation with a shearing action.

Figure 7:
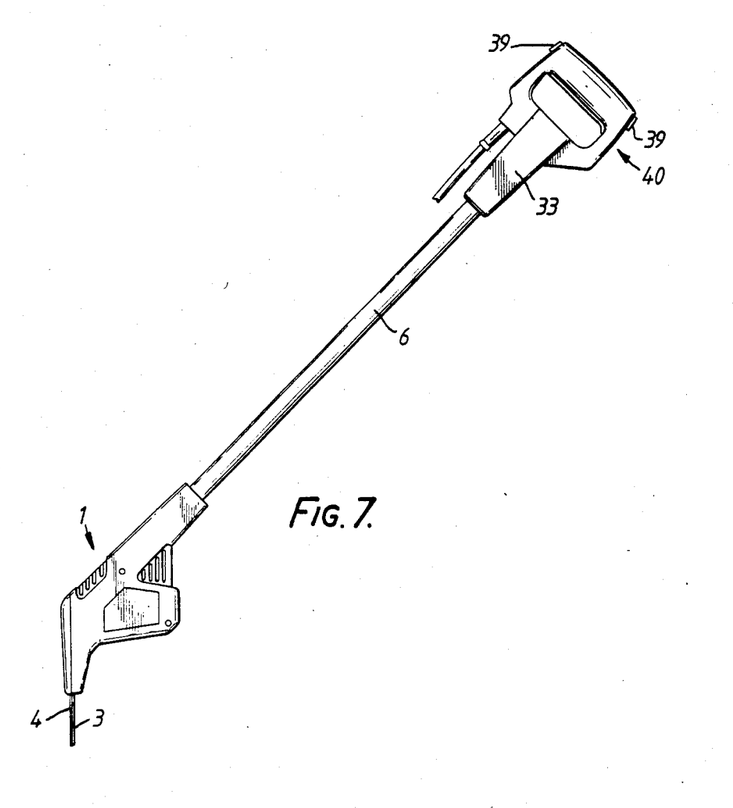
FIG. 7 is a side view of the tool in another orientation.

The tool can also be used to weed between paving stones or to trim the edge of a lawn. In these applications the tool is held in the orientation shown in FIG. 7 with the blades 3, 4 in vertical planes. The arrangement of the handle 40 enables the tool to be held comfortably in this orientation also.

The blades 3, 4 described above pivot about apertures 12 provided on the longitudinal centre line of the tool. It is however possible for the apertures 12 to be offset from the centre line as indicated by the dotted line position 12a in FIG. 4. This would enable the throw of the blades to be increased.

Figure 8:
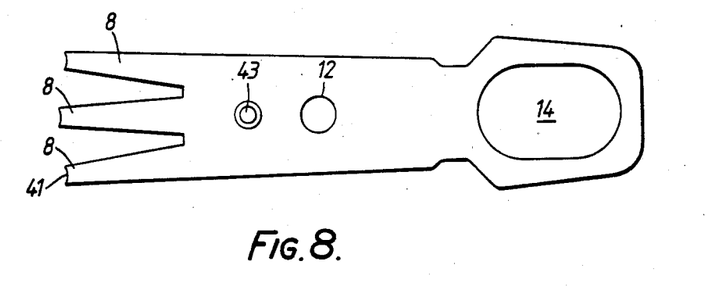
FIG. 8 is a plan view of an alternative form of blade for the tool.

The exact shaping of the forked ends of the blades can be varied: for example, FIG. 8 shows an alternative form of blade in which the prongs 8 are less spread out and whereas the prongs of the blade shown in FIG. 5 have rounded points at their ends those shown in FIG. 8 have cut-off ends in which are formed small recesses 41. The blades may be formed from mild steel and typical dimensions for the blade shown in FIG. 5 are as follows:

thickness—2 mm (approximately)
overall length—20 cm
length of prongs 8—6.5 cm
angle between prongs—20°
width of portion 11—3.5 cm The dimensions of the blades shown diagrammatically in FIG. 8 are similar except that the prongs are shorter (typically, 4.5 cm) and the angle between them is smaller (typically, 10°).

What is claimed is:

1. A method of cultivating soil with a cultivating tool having a pair of superimposed soil working members with fork-like operating ends which project in a direction from a housing of the cultivating tool, and power means for drivingly reciprocating said members comprising the steps of:

setting the tool down on the surface of the soil to be cultivated with said housing contacting said soil surface and being supported thereby;

reciprocating each of the soil working members in adjacent planes relative to one another in a direction transverse to the direction in which they project from the housing;

penetrating the surface of the soil with fork-like operating ends of said soil working members and with said planes extending into the soil at an acute angle to said surface; and manually maneuvering the tool on the soil surface with said housing in contact with and supported by the soil surface, with said soil working members reciprocating, and with said planes penetrating the soil surface at said acute angle whereby said fork-like operating ends thoroughly disturb the soil and free weeds therefrom.

2. A method according to claim 1 in which both soil working members are reciprocated in opposite directions.

3. A method according to claim 2 in which the relative reciprocation of the soil working members is relative pivotal movement of the members.

4. A cultivating tool, comprising:

a housing having a sole plate at the bottom thereof;
   a motor supported above said sole plate;
   said housing having a slit adjacent said sole plate at a front end of said housing;
   a pair of soil working blades, said blades being plate-like with one superimposed over the other;
   said blades being pivoted intermediate forward and rear portions thereof about a common pivot supported by said housing, said blade forward portions being generally fork-shaped;
   said blades extending through said slit with said blade rear portions being located inside said housing and said blade forward portions extending outside said housing;
   transmission means, drivingly connected between said motor and said blades, for reciprocating said blades about said pivot with said blades being simultaneously reciprocated but in opposite directions;
   said blades extending forwardly and downwardly from said housing at an acute angle relative to said sole plate, whereby said forward portions penetrate into soil when said sole plate is placed on the soil; and
   a shaft connected to said housing and extending rearwardly and upwardly therefrom to a handle.

5. The cultivating tool of claim 4, wherein said transmission means comprises two cams, one of said cams acting upon one of said blades and the other of said cams separately acting upon the other of said blades.

6. The cultivating tool of claim 5, wherein said cams are mounted to rotate about a common axis with said cams being disposed eccentrically to opposite sides of said axis.

7. The cultivating tool of claim 6, wherein said transmission means comprises a gear rotatably driven by said motor, and said cams are fixed to one side of said gear for rotation therewith, one cam being superimposed on the other.

8. The cultivating tool of claim 4, wherein said common pivot is disposed to one side of a longitudinal center line extending from the rear portion to the forward portion of said one blade, and to an opposite side of a corresponding longitudinal center line of said other blade.

9. The cultivating tool of claim 5, wherein:

the rear portions of said blades have elongated apertures therein and in which said cams respectively engage;

said motor is an electric motor and is mounted in said housing above said transmission means;

said housing has a portion of reduced height extending forwardly of said motor to said slit;

said shaft is disposed at an angle of approximately 45 degrees to said sole plate; and said handle is generally rectangular with a central aperture, an upper tubular portion of the handle having a switch therein for energizing said electric motor, longitudinal axes of said tubular portion and said handle lying in a common plane;

whereby said cultivating tool can be held in either of two operating orientations, in one of which said blades enter the soil substantially parallel to the surface of the soil, and in the other of which said blades enter the soil substantially vertically.

10. A soil working tool, comprising:
a housing having a flat base surface at the bottom thereof for supporting the tool on soil to be worked;
a motor supported by said housing;
a pair of superimposed soil working blades mounted in said housing with fork-shaped operating ends external to said housing and extending forwardly from said housing;
said blades being pivoted in said housing about a common axis extending transversely to said base surface;
transmission means, drivingly connected between said motor and said blades, for simultaneously reciprocating said blades about said axis in opposite directions;
said fork-shaped operating ends being of generally lamellar construction and being disposed in parallel planes, said planes extending adjacent said base surface and passing through said housing above said base surface;
said planes extending forwardly and downwardly at an acute angle relative to said flat base surface to effect penetration of said operating ends of the blades into the soil when said tool is supported by said flat base surface on the soil; and
a handle connected to said housing for manipulating said tool.

11. The soil working tool of claim 10, wherein said housing has a slit adjacent a forward end of said base surface, and said blades protrude through said slit.

12. The soil working tool of claim 11, wherein:
said blades are pivoted intermediate rear portions thereof and said operating ends;
said transmission means comprises a gear rotated by said motor about a rotational axis, and two cams secured to said gear for rotation about said rotational axis, said cams being disposed eccentrically to opposite sides of said rotational axis, each cam engaging with said rear portion of a respective one of said blades to effect reciprocation thereof;
said motor is an electric motor; and
said handle is provided with a switch for actuating said motor.

13. A soil working tool, comprising:
a housing having a base at the bottom thereof for supporting the tool on soil to be worked;
a pair of superimposed, oppositely reciprocating, plate-like blades pivotally mounted in said housing and extending downwardly and forwardly out of said housing;
forward operating ends of said blades forwardly penetrating into the soil at an acute angle to the surface of the soil when said tool is supported thereon by said base, said operating ends reciprocating in adjacent parallel planes which make the same acute angle with said surface;
an elongate stem connected to and extending rearwardly and upwardly from said housing and having at an upper end a handle for manipulation of said tool on the soil;
an electric motor mounted in said housing and having a drive shaft disposed transversely to said base;
a transmission drivingly connected between said motor and said blades for reciprocating said blades about a common pivotal axis;
said transmission comprising the drive shaft of said motor meshing with a gear rotatably mounted in said housing, two cams fixed to said gear for rotation therewith about a common rotational axis, and an elongate aperture in a rear portion of each blade and in which a respective one of said cams rotatably engages;
said cams being superimposed upon each other, being disposed to one side of said gear, and being disposed eccentrically to opposite sides of said common rotational axis; and
said common rotational axis, said common pivotal axis and said drive shaft being parallel to each other with said common rotational axis being disposed between said common pivotal axis and said drive shaft.

* * * * *